Aug. 30, 1932.  B. M. LEECE ET AL  1,875,043
VOLTAGE REGULATION
Filed March 10, 1930   2 Sheets-Sheet 1
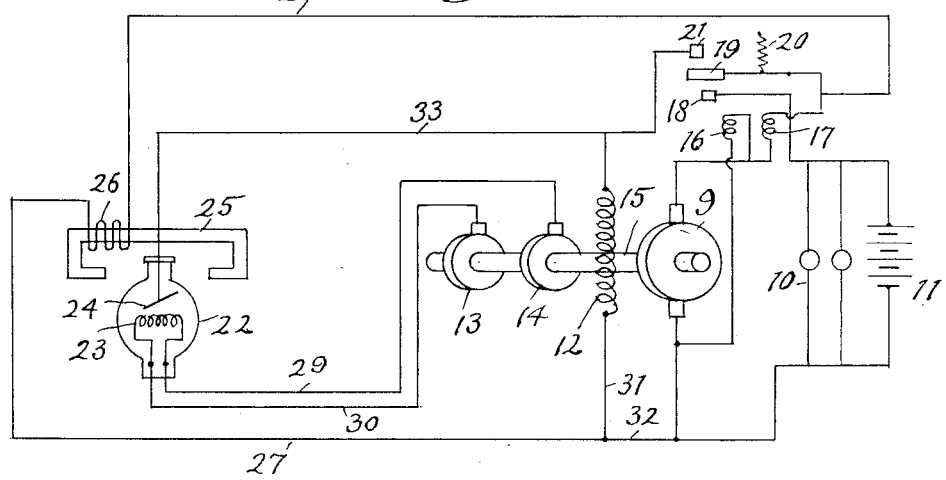
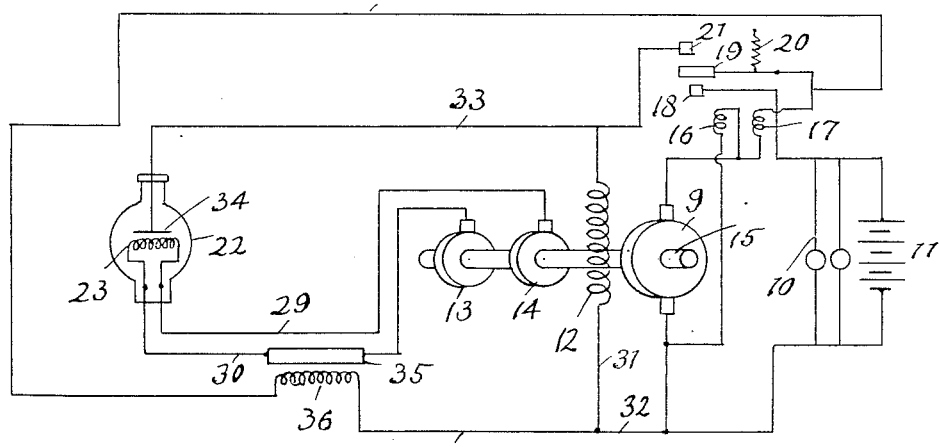
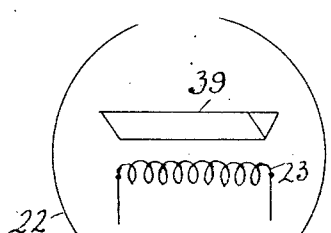
Inventors.
Bennett M. Leece
and Dale S. Cole
Kwis Hudson & Kent
Attys.

Aug. 30, 1932.   B. M. LEECE ET AL   1,875,043

VOLTAGE REGULATION

Filed March 10, 1930     2 Sheets-Sheet 2

Inventors.
Bennett M. Leece
Dale S. Cole
Kerr Hudson & Kent
Attys.

Patented Aug. 30, 1932

1,875,043

UNITED STATES PATENT OFFICE

BENNETT M. LEECE, OF CLEVELAND, AND DALE S. COLE, OF CLEVELAND HEIGHTS, OHIO, ASSIGNORS TO THE LEECE-NEVILLE COMPANY, OF CLEVELAND, OHIO, A CORPORATION OF OHIO

VOLTAGE REGULATION

Application filed March 10, 1930. Serial No. 434,506.

This invention relates to voltage regulators for electric generators, and more particularly to devices of this character for regulating the voltage of generators which are operated under widely different conditions of speed and load, such as lighting, ignition, and battery charging generators of engine driven vehicles.

It is an object of the present invention to provide a substitute for the vibrators heretofore used for this purpose.

Other objects are to simplify and improve the construction and operation of devices of this character.

In the accompanying drawings—

Fig. 1 is a diagram of apparatus and circuit according to one embodiment of the invention, including the vacuum tube;

Fig. 3 is similar to Fig. 1, modified by the substitution of a resistance in series with the filament.

Figs. 5, 6 and 7 are modifications of the arrangements of the filament and plate for the vacuum tube. Fig. 5 shows a V-shaped plate, Fig. 6 shows a conical plate, while Fig. 7 shows a pivoted plate acted upon by an external magnet.

Figure 2:
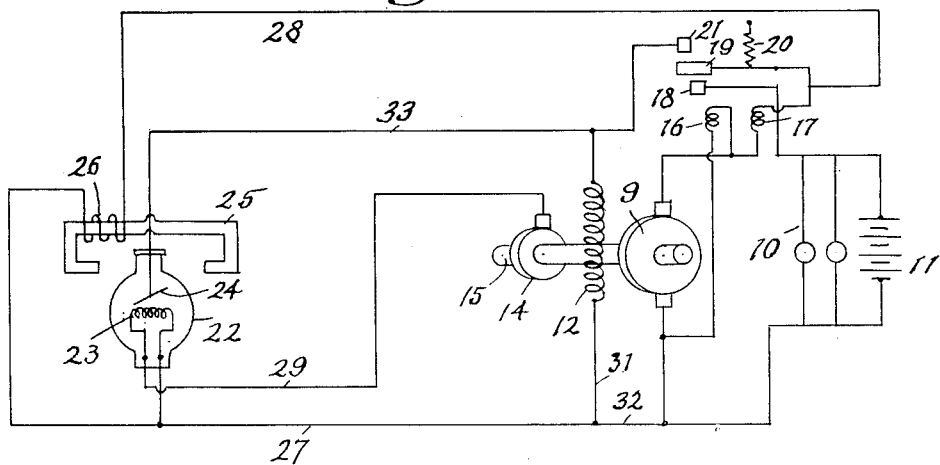
Fig. 2 is a similar diagram showing the employment of a single slip ring in lieu of the two shown in Fig. 1.

Referring more particularly to the drawings for an illustration of voltage regulation for automotive generators according to several embodiments of the invention, in Fig. 1 there is illustrated the armature 9 of a direct current shunt generator, lamps 10, usual storage battery at 11, generator field winding at 12, and two slip rings at 13 and 14. The battery and lamps connected as shown form the load circuit of the generator. The winding of the armature 9 is of the ring type and the slip rings are mounted on the same shaft 15 as the armature and commutator, and so connected into the armature winding as to provide single phase alternating E. M. F.

A reverse current cut-out is provided, comprising the usual shunt coil 16, a series coil 17, load contact 18, and movable contact 19. A spring 20 normally maintains the contact 19 away from the contact 18. An additional contact 21 is provided, which is connected to the field 12 of the generator.

A conventional two element vacuum tube is shown at 22. This tube is provided with a filament 23 and a plate 24 which may have various shapes, as illustrated and described hereinafter.

The tube 22 is located in the field of an electro-magnet 25 having a coil 26, which is connected across the terminals of the generator by means of conductors 27 and 28 so as to respond to changes of voltage.

The filament 23 is connected by conductors 29 and 30 to the slip rings 13 and 14. One end of the field coil of the generator is connected to one D. C. brush through conductors 31 and 32. The other end of the field is connected to plate 24 of the tube by conductor 33.

In operation, rotation is imparted to the armature shaft, the cut-out armature contact 19 being held by the spring 20 in engagement with the field contact 21. The field 12 is thereby connected across the brushes of the generator armature, thus insuring full field for the purpose of starting. As soon as the generated voltage builds up, the coils 16 and 17 move the cut-out armature contact 19 away from the contact 21 into engagement with the load contact 18. This action breaks the starting circuit for the field and closes the generator load circuit.

At the same time the filament 23 is being heated white hot, or lighted, by the alternating E. M. F. from the slip rings 13 and 14, and a stream of electrons emitted from the filament passes to the plate 24. This stream of electrons forms a conductor from the filament to the plate, and completes the normal field circuit through the conductor 33 to the field 12. Thus the generator field circuit is completed by the tube 22, and as the filament 23 has a low cold resistance, the generator voltage may not build up unless a full field is supplied in starting. With the present arrangement, the contact 21 supplies the full starting field but cuts out as soon as the generator voltage has built up. It will be understood, of course, that the field circuit, which is established through the vacuum tube 22, conductor 33 and field winding 15 during the normal operation of the generating system, is completed through the conductor 31, the ring winding of the armature 9, and the slip rings 13 and 14 and conductors 29 and 30, back to the filament of the vacuum tube.

The coil 26 is connected to the armature brushes of the generator by conductors 27 and 28, as already stated, so that as the armature voltage varies the voltage impressed on coil 26 varies, or in other words, the field strength of the magnet 25 varies with the voltage. Furthermore, the field circuit of the generator is through the vacuum tube so that if the amount of current passing through the tube from filament to plate be varied the field strength of the generator is varied.

The plate 24 of the tube is shown inclined at an angle with respect to filament 23. With the polarities of the magnet 25 properly arranged as the voltage of the generator rises, the field produced by magnet 25 becomes stronger and displaces or blows the stream of electrons coming from the filament 23 from the end of the plate 24 closest to the filament, toward the end inclined farther away from the filament. This action introduces a longer path for the stream of electrons between the filament and plate, which results in a decrease of the field current. As the voltage impressed on coil 26 decreases the magnet field has the reverse effect on the stream of electrons, causing an increase in the current passing through the field winding, with the result that the voltage of the generator is very closely regulated.

It will be obvious that when the speed of the generator armature shaft decreases, as when the automobile engine is stopped, the reverse current cut-out operates by the customary action of the coils 16 and 17 to move the cut-out armature contact 19 away from the load contact 18, for preventing discharge from the battery through the generator armature or through the magnet coil 26, when the generated voltage due to decreased speed is less than the back E. M. F. of the storage battery.

The modification illustrated in Fig. 2 is identical with Fig. 1 to such an extent that the same description and characters of reference will suffice, except that the slip ring 13 and conductor 30 are omitted, the corresponding end of the filament 23 being connected instead to the conductor 27. The current for heating the filament 23 in this arrangement is taken off from the slip ring 14 and one of the generator armature brushes.

In the arrangement illustrated in Fig. 3, another expedient is substituted for the electromagnet 25. Plate 34 of the tube is shown geomtrically parallel to filament 23. Interposed in the conductor 30, in series with the filament 23, is a resistance member 35 with a positive temperature coefficient of resistance. Coil 36 is connected by conductors 27 and 28 across the terminals of the generator. As the voltage rises the current through this coil 36 rises. The coil is employed as a heating coil to heat resistance member 35. As the voltage rises the member 35 is heated and its resistance increases, reducing the current through the filament 23, thus reducing the emission of electrons from this filament, and since the field current of the generator passes through this stream of electrons, the field current is reduced. When the generator voltage decreases, the member 35 is heated to a lesser degree, and its resistance decreases, which increases the current through the filament 23, thus increasing the emission of electrons from the filament, and increasing the conductivity thereof for the field current. In this manner the generator voltage is regulated.

Figure 4:
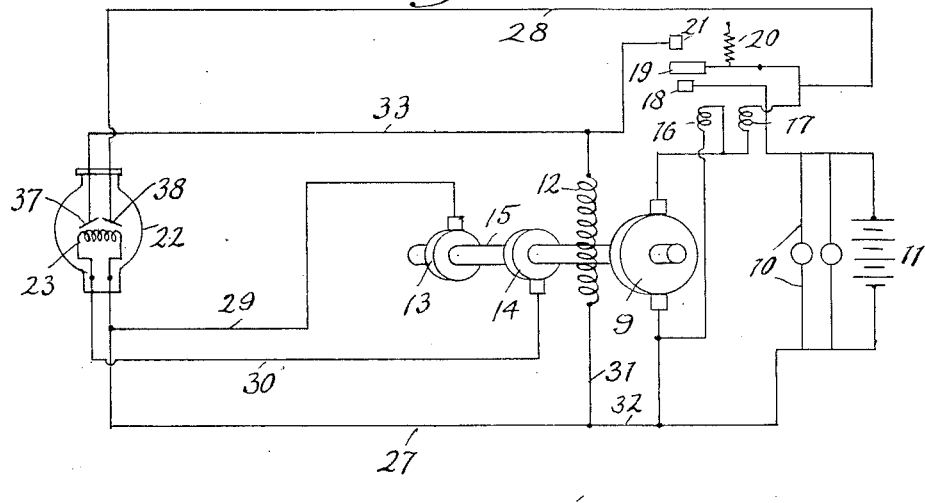
Fig. 4 is a diagram showing a modification within the tube.

Fig. 4 illustrates another variation in which two plates 37 and 38 are employed in the tubes 22. The field 12 has one terminal connected to one brush of the generator and has its other terminal connected by conductor 33 to plate 37. Plate 38 has such polarity that it tends to deflect electrons from plate 37, plate 38 being connected by conductor 28 to the opposite brush of the generator. The filament 23 has its terminals connected by conductors 29 and 30 to the slip rings 13 and 14 and it is connected by conductor 27 to the first named brush of the generator so that the potential difference between plate 38 and the filament 23 is the generator voltage. As the voltage rises, plate 38 tends to deflect more electrons from plate 37, and thereby reduces the current supplied by the tube 22 to the field 12. When the voltage decreases the deflection of the electron stream is reduced, and the conductivity thereof is increased, thus increasing the field current. Thus the desired regulation of the generator voltage is effected.

Figures 6, 7:
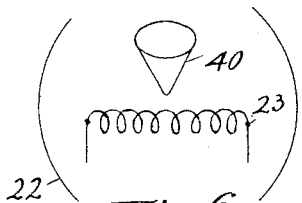

Figs. 5, 6 and 7 illustrate modifications of the internal arrangement of the tube 22. Fig. 5 illustrates a V-shaped plate 39 which may be associated with the filament 23 of Figs. 1 or 2, whereby the stream of electrons emitted from the filament 23 may be deflected from the point to the wings of the V-shaped plate 39 by the field of the electromagnet 25, thus increasing the distance between filament and plate, and decreasing the current passing through the tube.

Fig. 6 illustrates a cone shaped plate 40 which may be operated in the same manner as the plate 39, the stream of electrons being deflected from the apex toward the base of the cone.

Fig. 7 shows a plate 41 pivoted as at 42 inside of the tube 22, and having an arm 43 rigid therewith which can be acted upon by a magnet 44 outside the glass wall of the tube 22 in in such manner that the plate 41 may be caused to swing about the pivot 42 and move angularly away from the filament 23 thus increasing the effective distance between filament and plate and regulating the amount of current passed through the tube.

While several embodiments of the invention have been disclosed, the scope of the invention is not limited to the exact disclosure but includes such embodiments of the broad idea as fall within the scope of the appended claims.

Having thus described our invention, what we claim is:

1. In combination with a generator having an armature and a field winding, a circuit for said field winding for normally supplying exciting current to the latter, thermionic valve means in said circuit for controlling the excitation of the field during normal operation of the generator, and an electromagnet responsive to the voltage of the generator for connecting said field winding in a shunt circuit across said armature during starting and opening said shunt circuit when the generator voltage reaches a predetermined value.

2. In combination with a generator having an armature and a field winding, a circuit for said field winding for normally supplying exciting current to the latter, a thermionic valve in said circuit, means for regulating the conductivity of said thermionic valve to vary the excitation of said field winding, and an electromagnet responsive to the voltage of the generator for connecting said field winding in a shunt circuit across said armature during starting and opening said shunt circuit when the generator voltage reaches a predetermined value.

3. In combination with a generator having an armature and a field winding, a circuit for said field winding for normally supplying exciting current to the latter, a thermionic valve in said circuit, means responsive to generator voltage for regulating the conductivity of said thermionic valve to vary the excitation of said field winding, and an electromagnet having a coil responsive to generator voltage for connecting said field winding in a shunt circuit across said armature during starting and opening said shunt circuit when the generator voltage reaches a predetermined value.

4. In combination with a generator having an armature and a field winding, a circuit for said field winding for normally supplying exciting current to the latter, a thermionic valve in said circuit, an electromagnet responsive to generator voltage for regulating the conductivity of said thermionic valve to vary the excitation of said field winding, and an electromagnet having a coil responsive to generator voltage for connecting said field winding in a shunt circuit across said armature during starting and opening said shunt circuit when the generator voltage reaches a predetermined value.

5. In combination with a generator having an armature and a field winding, a circuit for said field winding for supplying exciting current to the latter, a thermionic valve in said circuit for controlling the field current, a filament in said valve, a circuit for heating said filament, an element in said filament circuit having a positive temperature coefficient of resistance, and means responsive to generator voltage for heating said element.

6. In combination with a generator having an armature and a field winding, a circuit for said field winding for normally supplying exciting current to the latter, a thermionic valve in said circuit for controlling the field current, a filament in said valve, a circuit for heating said filament, an element in said filament circuit having a positive temperature coefficient of resistance, means responsive to generator voltage for heating said element, and an electromagnet having a coil responsive to generator voltage for connecting said field winding in a shunt circuit across said armature during starting and opening said shunt circuit when the generator voltage reaches a predetermined value.

In testimony whereof, we hereunto affix our signatures.

BENNETT M. LEECE.
DALE S. COLE.